(12) United States Patent
Kim et al.

(10) Patent No.: US 10,461,834 B2
(45) Date of Patent: Oct. 29, 2019

(54) METHOD AND DEVICE FOR SELECTING AND ALLOCATING TRANSMISSION BEAM INDEX HAVING PRIORITY

(71) Applicant: Samsung Electronics Co., Ltd., Suwon-si, Gyeonggi-do (KR)

(72) Inventors: Jaewon Kim, Seoul (KR); Hyunkyu Yu, Suwon-si (KR); Suryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 15/116,415

(22) PCT Filed: Feb. 16, 2015

(86) PCT No.: PCT/KR2015/001578
§ 371 (c)(1),
(2) Date: Aug. 3, 2016

(87) PCT Pub. No.: WO2015/126130
PCT Pub. Date: Aug. 27, 2015

(65) Prior Publication Data
US 2017/0012692 A1      Jan. 12, 2017

(30) Foreign Application Priority Data

Feb. 19, 2014  (KR) .................. 10-2014-0018818

(51) Int. Cl.
*H04B 7/06* (2006.01)
*H04W 72/10* (2009.01)

(52) U.S. Cl.
CPC .......... *H04B 7/0695* (2013.01); *H04B 7/063* (2013.01); *H04B 7/0617* (2013.01); *H04W 72/10* (2013.01)

(58) Field of Classification Search
CPC .... H04B 7/0617; H04B 7/063; H04B 7/0695; H04B 7/0408; H04B 7/1027; H04B 7/066;
(Continued)

(56) References Cited

U.S. PATENT DOCUMENTS

| 6,751,206 B1 | 6/2004 | Padovani et al. |
| 2006/0073850 A1* | 4/2006 | Cha .................. H04B 7/0608 455/562.1 |

(Continued)

FOREIGN PATENT DOCUMENTS

| CN | 101911760 A | 12/2010 |
| CN | 101926103 A | 12/2010 |

(Continued)

OTHER PUBLICATIONS

Fujitsu, Multi-beam MIMO for EUTRA Downlink, 3GPP draft R1-051438, vol. RAN WG1, meeting No. 43, Nov. 7-11, 2005, Seoul, Korea.

(Continued)

*Primary Examiner* — Kyaw Z Soe
(74) *Attorney, Agent, or Firm* — Jefferson IP Law, LLP

(57) ABSTRACT

The present invention relates to a method and a device for selecting and allocating a transmission beam index having a priority. The present invention, in this regard, relates to a method for transmission and reception by a base station in a wireless communication system capable of configuring a plurality of beams, the method comprising the steps of: transmitting a reference signal, using at least one transmission beam; receiving index information of the at least one transmission beam from a terminal; and scheduling a beam corresponding to one piece of information among the index information of the at least one transmission beam for the terminal, wherein the index information is the index infor- (Continued)

* Beam Index (BI)

mation of the at least one transmission beam selected by the terminal on the basis of the priority pre-configured for the plurality of beams.

16 Claims, 11 Drawing Sheets

(58) Field of Classification Search
CPC ..... H04B 7/088; H04B 7/0608; H04W 72/10; H04W 16/28
See application file for complete search history.

(56) References Cited

U.S. PATENT DOCUMENTS

| | | | | |
|---|---|---|---|---|
| 2007/0249402 | A1* | 10/2007 | Dong | H04B 7/0408 455/562.1 |
| 2008/0020772 | A1 | 1/2008 | Shen et al. | |
| 2009/0130980 | A1 | 5/2009 | Palanki et al. | |
| 2009/0189812 | A1 | 7/2009 | Xia et al. | |
| 2009/0197629 | A1 | 8/2009 | Borran et al. | |
| 2010/0103900 | A1 | 4/2010 | Yeh et al. | |
| 2010/0120359 | A1* | 5/2010 | Agarwal | H04B 7/18539 455/12.1 |
| 2010/0128688 | A1* | 5/2010 | Song | H04W 72/10 370/329 |
| 2010/0177725 | A1 | 7/2010 | Van Rensburg | |
| 2010/0273499 | A1 | 10/2010 | Van Rensburg et al. | |
| 2011/0110453 | A1* | 5/2011 | Prasad | H04B 7/0695 375/285 |
| 2012/0082052 | A1 | 4/2012 | Oteri et al. | |
| 2013/0039345 | A1* | 2/2013 | Kim | H04W 72/046 370/332 |
| 2013/0155847 | A1 | 6/2013 | Li et al. | |
| 2014/0044044 | A1 | 2/2014 | Josiam et al. | |
| 2014/0341048 | A1* | 11/2014 | Sajadieh | H04L 5/0085 370/252 |
| 2015/0229375 | A1* | 8/2015 | Vook | H04B 7/0469 370/329 |
| 2016/0211899 | A1* | 7/2016 | Yang | H04B 17/318 |

FOREIGN PATENT DOCUMENTS

| | | |
|---|---|---|
| CN | 101981981 A | 2/2011 |
| CN | 102282885 A | 12/2011 |
| CN | 103152084 A | 6/2013 |
| WO | 2013/039352 A2 | 3/2013 |

OTHER PUBLICATIONS

Ohinese Office Action with English translation dated Aug. 14, 2019; Chinese Appln. No. 201580009535.8.

* cited by examiner

METHOD AND DEVICE FOR SELECTING AND ALLOCATING TRANSMISSION BEAM INDEX HAVING PRIORITY

TECHNICAL FIELD

The present invention relates to a device and method of allocating and selecting a transmission beam index with a priority.

BACKGROUND ART

In recent wireless communication, a variety of methods have been proposed to increase a data communication demand and support a data service with a large amount of data. In order to increase a data communication demand and support a data service of a large amount of data, communication needs a high data rate. In order to achieve a high data rate, it is effective to use broadband frequency resources. However, most of the range of frequency resources, i.e., frequency bands from hundreds of MHz to a few GHz, have already been used for services by various service providers and systems as well as cellular systems. Therefore, it is not easy to secure additionally available frequency resources in the bands.

Recently, high carrier frequency bands which can easily secure an available frequency resource of a broadband have been allowed for the use of cellular system services. The higher the carrier frequency the shorter the transmission distance of signals, and this reduces the service coverage. Considering the feature, base stations of a cellular system use a beam-forming technology.

Beam-forming can efficiently extend the transmission distance of signals and the service coverage. Beam-forming refers to a technique that allows one transmitter to focus the transmission direction of signals on a particular direction using one or more array antennas or horn antennas. The beam-forming technology transmits signals in a corresponding direction to an increased transmission distance and decreases signals received from directions other than the corresponding direction, thereby reducing interference with unnecessary signals.

Although conventional communication signals extends a service coverage area and reduces an amount of interference using beam-forming, it needs to determine respective beams of the transmitter and the receiver in direction and in shape, in order to use an optimal channel.

DISCLOSURE OF INVENTION

Technical Problem

The present invention has been made to address the above problems and disadvantages, and to provide at least the advantages described below. Accordingly, the present invention provides a scheme that efficiently performs the beam selection by a terminal and the beam allocation by a base station in a cellular base station beam-forming environment where the terminal measures a plurality of beams with a high level of reference signal received power (RSRP), thereby increasing the frequency efficiency of a system.

Solution to Problem

In accordance with an aspect of the present invention, a transmission/reception method of a base station in a wireless communication system capable of forming a plurality of beams is provided. The method includes: transmitting a reference signal using at least one transmission beam; receiving index information regarding at least one transmission beam from a terminal; and from among the index information regarding at least one transmission beam, scheduling a beam corresponding to one item of the index information for the terminal. The index information is index information regarding the at least one transmission beam that the terminal selects from the plurality of beams, based on preset priorities of the plurality of beams.

In accordance with another aspect of the present invention, a transmission/reception method of a terminal in a wireless communication system capable of forming a plurality of beams is provided. The method includes: measuring reference signals regarding the plurality of beams; transmitting, to a base station, index information regarding at least one transmission beam which is selected from among the plurality of beams, based on preset priority; and receiving, from the base station, a schedule of a beam corresponding to one item of the index information regarding at least one transmission beam.

In accordance with another aspect of the present invention, a base station configured to perform transmission/reception in a wireless communication system capable of forming a plurality of beams is provided. The base station includes: a communication unit for performing data communication with a terminal; and a controller for controlling the communication unit to: transmit a reference signal using at least one transmission beam, to the terminal; receive index information regarding at least one transmission beam from the terminal; and schedule a beam corresponding to one item of the index information for the terminal, from among the index information regarding at least one transmission beam. The index information is index information regarding the at least one transmission beam that the terminal selects from the plurality of beams, based on preset priorities of the plurality of beams.

In accordance with another aspect of the present invention, a terminal configured to perform transmission/reception in a wireless communication system capable of forming a plurality of beams is provided. The terminal includes: a communication unit for performing data communication with a base station; and a controller for controlling the communication unit to: measure reference signals regarding the plurality of beams; transmit, to the base station, index information regarding at least one transmission beam which is selected from among the plurality of beams, based on preset priority; and receive, from the base station, a schedule of a beam corresponding to one item of the index information regarding at least one transmission beam.

Advantageous Effects of Invention

The method and device according to the present invention is capable of allowing: a terminal to efficiently select an index of a beam with a priority; and a base station to efficiently allocating the beam, thereby increase the frequency efficiency of a system.

MODE FOR THE INVENTION

Embodiments of the present invention are described in detail referring to the accompanying drawings. Detailed descriptions of well-known functions and structures incorporated herein may be omitted to avoid obscuring the subject matter of the invention. The terms and expressions in the following description are defined to describe operations and features of the present invention and may vary according to the purposes or usages of users or operators. Therefore, the terms and expressions should be defined and interpreted based on the overall content in the description.

Figure 1:
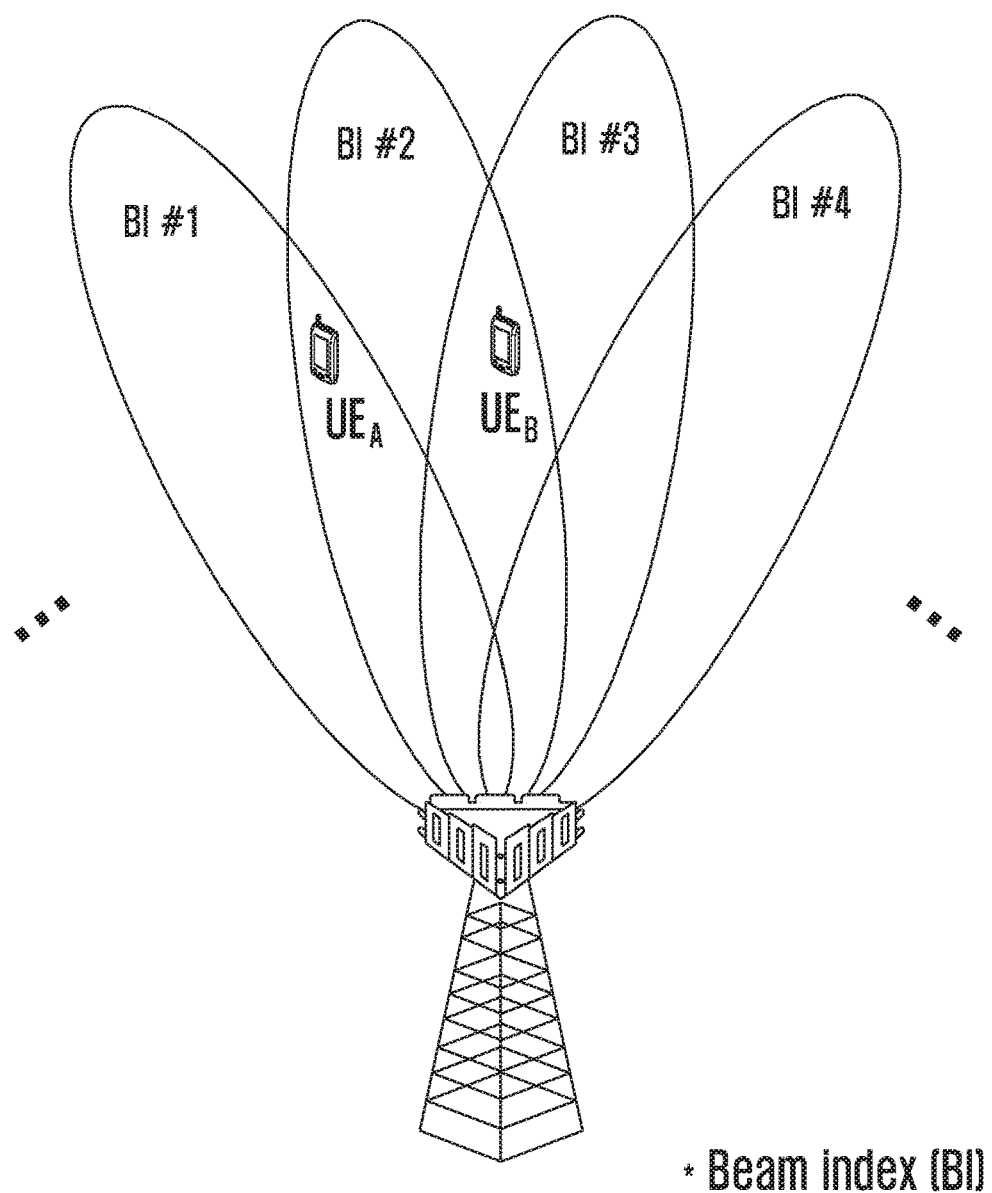
FIG. 1 is an example of a base station using beam-forming.

FIG. 1 is an example of a base station employing beam-forming. In the example, the base station employing beam-forming uses a plurality of beams.

The beam-forming applies different phase shift values to a number of antenna elements respectively, so that the base station can change the direction of a beam to its desiring direction and transmit the beam in the direction. In order to compensate for a large magnitude of path loss of a signal transmitted over a high frequency band, the beam-forming controls a beam to have a relatively narrow width. In order to transmit signals with a large beam gain to an area under a base station, the base station uses a plurality of beams with different directions, part of which are designed to overlap as shown in FIG. 1.

Figure 2:
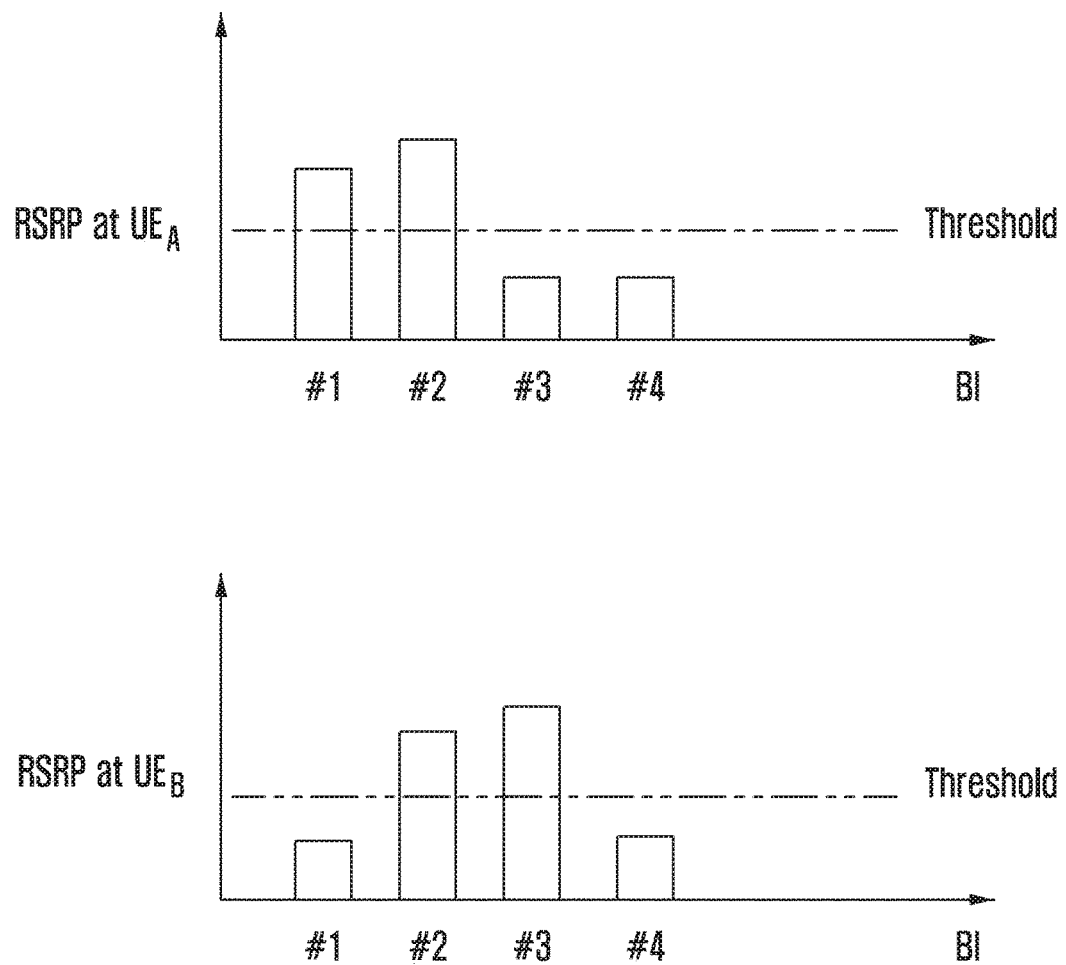
FIG. 2 is an example where UE detects a plurality of beams with high RSRP.

As beams are overlapped, individual user equipment (UE) devices detect a number of beams with high reference signal received power (RSRP) as shown in FIG. 2. That is, in a state where a UE device is capable of receiving a particular beam with RSRP the level of which is greater than or equal to a threshold, when the UE device is defined as it is within a coverage of a corresponding beam, UE devices in a cell may be within coverage of one or more downlink (DL) transmission beams.

In various embodiments of the present invention, UE selects 'one beam' or 'a set of beams' from a plurality of beams with RSRP greater than or equal to a threshold and feeds back the beam selection information (e.g., beam channel information, beam index, etc.) to a base station. In the following description, the embodiments are explained, based on the user of a beam index as beam selection information. In an embodiment, the feedback may be transmitted via a Physical Uplink Control Channel (PUCCH), but is not limited thereto.

The base station determines a beam to be allocated to UE and to provide a communication service to the UE, based on the beam selection information received from individual UE devices, and then informs the UE of the beam allocating information via a Physical Downlink Control Channel (PDCCH). In an embodiment, the beam allocation information may be transmitted via a PDCCH, but is not limited thereto.

The UE detects a beam allocated to itself via a PDCCH, and then communicates with the base station through a time/frequency resource used by a corresponding beam.

In order to perform the operations described above, the base station is capable of transmitting, when UE performs the initial attachment, beam-related information to the UE via an RRC signaling. The base station may also transmit beam-related information to UE via BCH. In an embodiment, the beam-related information may be transmitted/broadcast to UE periodically. Alternatively, the beam-related information may be transmitted to UE in occurrence of a particular event (e.g., a creation of data to be transmitted to UE, a change in beam information, etc.). Examples of the beam-related information are the number of beams, information regarding a Reference Signal, the priority of beams, etc., but are not limited thereto.

In a first embodiment of the present invention, UE selects a beam with the highest RSRP based on the measured RSRP and feeds back a beam index (BI) of the selected beam to the base station. The base station transmits/receives signals to/from UE devices, using beams corresponding to fed-back beam indexes, respectively.

Figure 3:
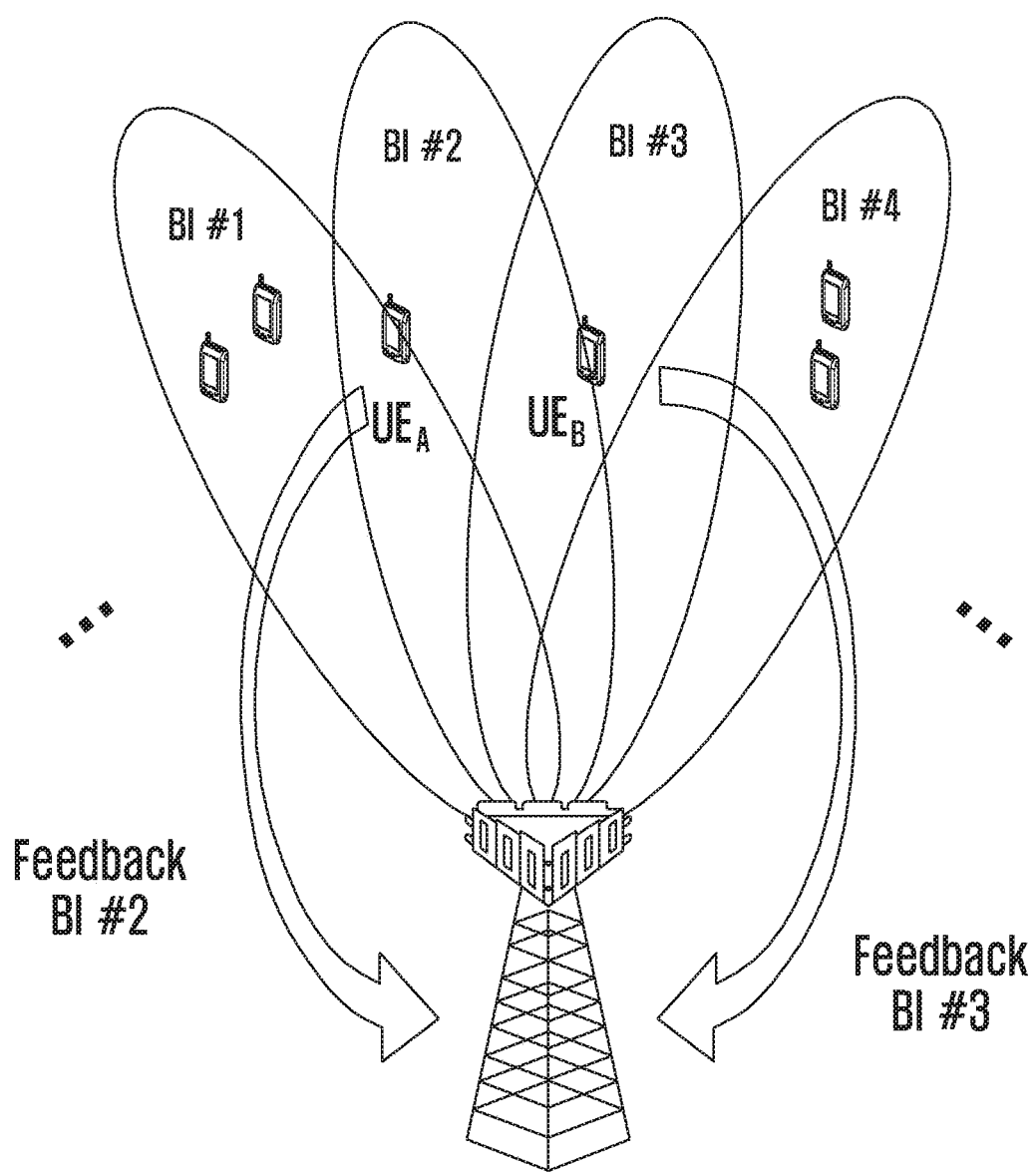
FIG. 3 is an example of a beam index that UE feeds back, according to a first embodiment of the present invention.
Figure 4:
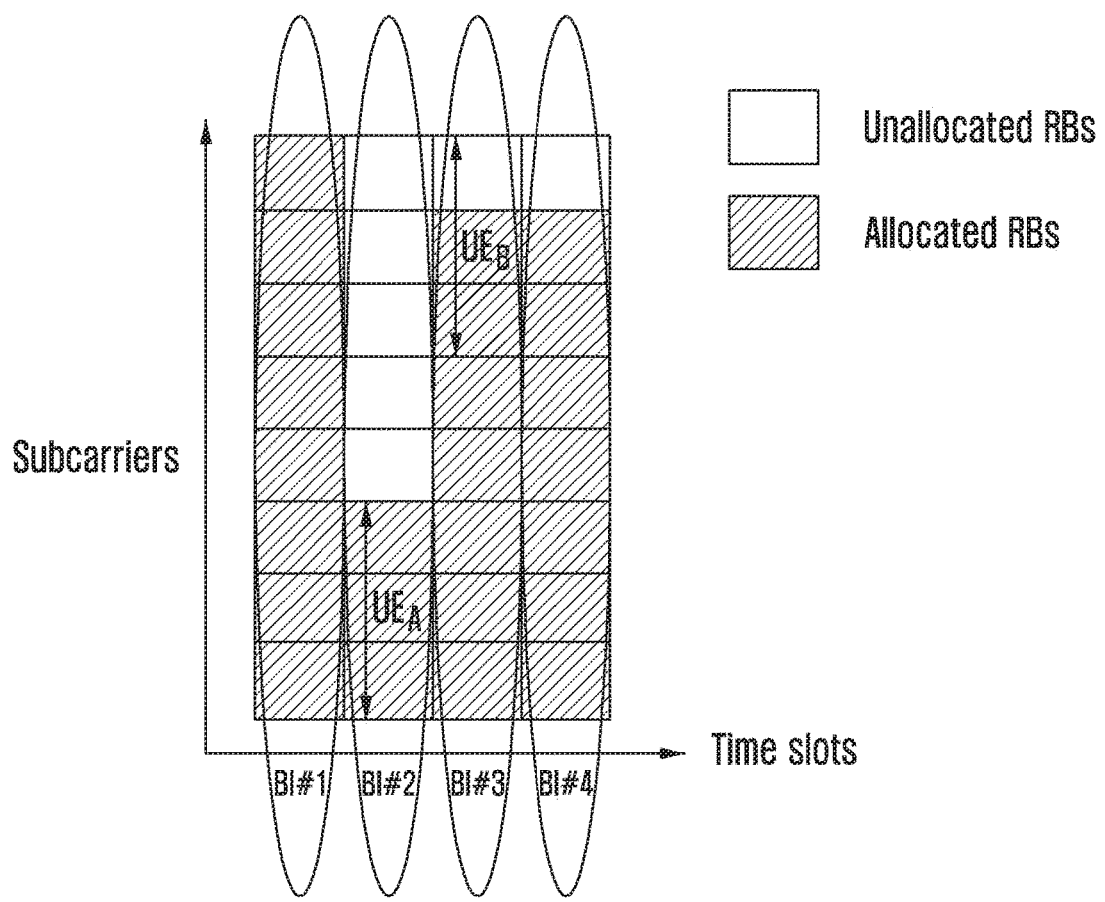
FIG. 4 is an example where a base station performs resource allocation in the embodiment referring to FIG. 3, according to a first embodiment of the present invention.

When the method described above is applied to $UE_A$ and $UE_B$ in the embodiment shown in FIG. 2, the $UE_A$ and $UE_B$ feed back BI #2 and BI #3 to the base station, respectively, as shown in FIG. 3. FIG. 4 is an example of resources which can be allocated when a base station schedules for the $UE_A$ and $UE_B$ using feedback information described in embodiment of FIG. 3.

Since the individual UE devices communicate with a base station using a beam with the highest RSRP, it is advantageous that they can obtain a relatively high level of signal-to-noise ratio (SNR) or signal-to-interference and noise ratio (SINR), compared with the use of other beams. When the individual UE devices that have selected BI #2 and BI #3, however, request a relatively small amount of data, since only three of eight subcarrier resources are allocated in the second and third time slots used by the corresponding respective beams as shown in FIG. 4, the frequency occupancy rate is 37.5%. In this case, the five subcarrier resources, not used for the transmission of signals, from the eight subcarrier resources in the time slots reduce the overall frequency efficiency in the system.

Figure 5:
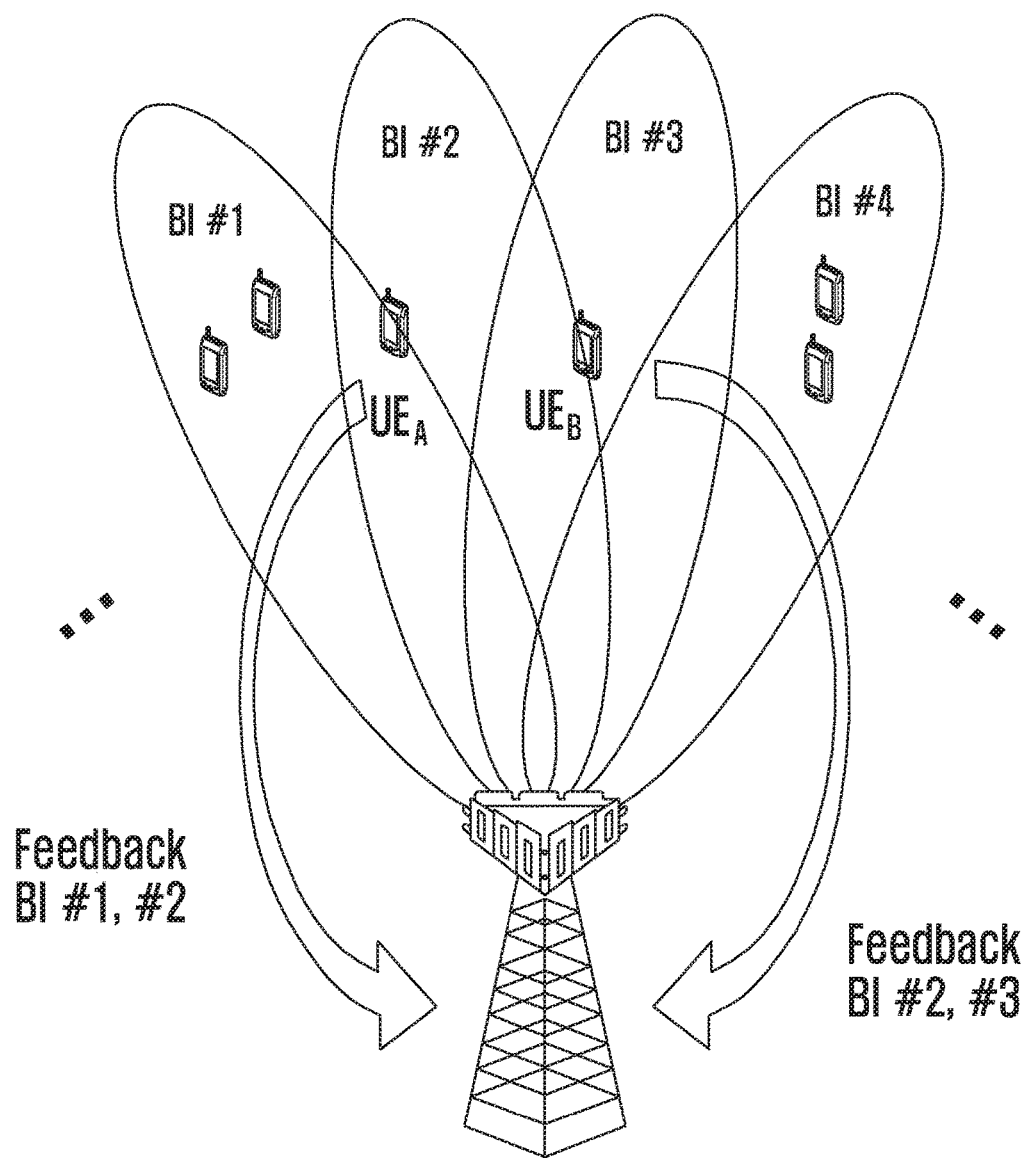
FIG. 5 is an example of a beam index that UE feeds back, according to a second embodiment of the present invention.

In a second embodiment of the present invention, UE measures RSRP of a plurality of beams and feeds back, to a base station, beams indexes (BIs) of all the beams with RSRP the level of which is greater than or equal to a preset threshold. When $UE_A$ and $UE_B$ measures the RSRP as shown in FIG. 2, the $UE_A$ and $UE_B$ feed back a set of BIs containing BI #2 and BI #3 to the same base station as shown in FIG. 5.

Figure 6:
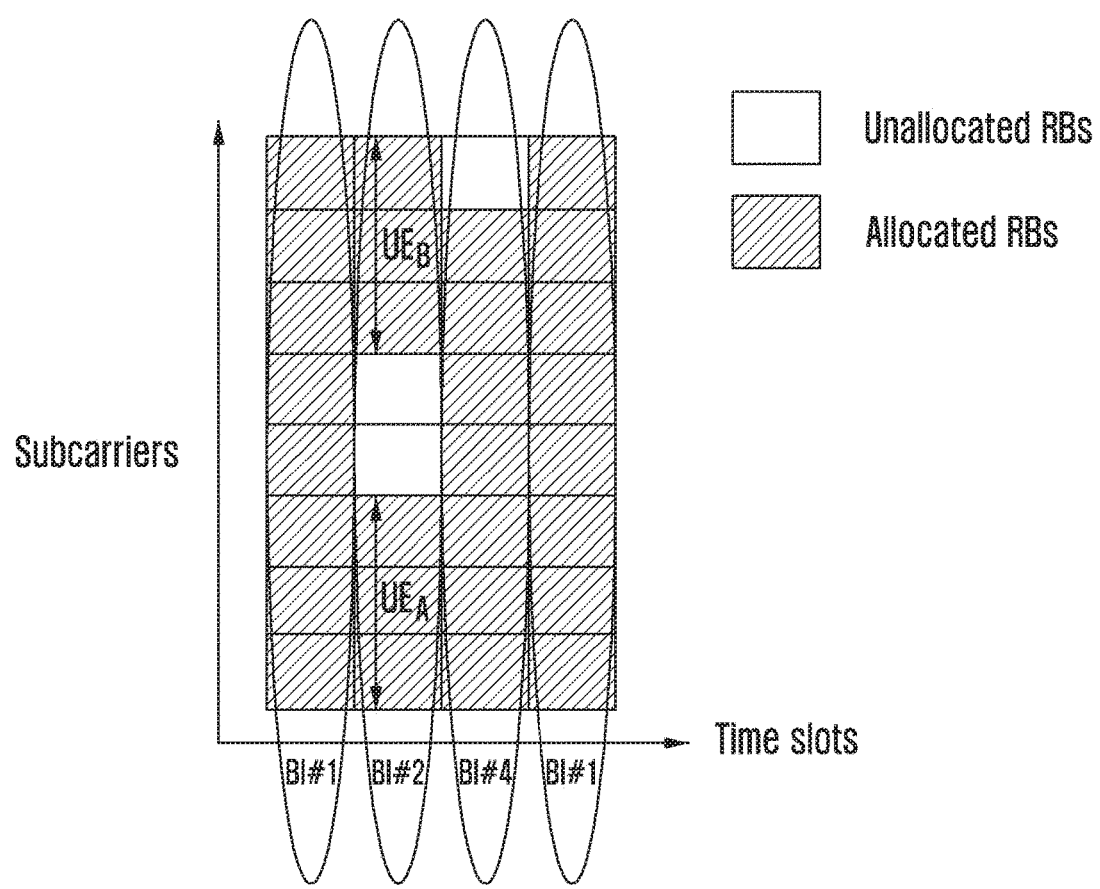
FIG. 6 is an example where a base station performs resource allocation in the embodiment referring to FIG. 5, according to a second embodiment of the present invention.

The base station selects a BI contained in the intersection of sets of BIs fed back from the two UE devices, and uses a beam corresponding to the selected BI for the transmission of signals. In the embodiment shown in FIG. 5, the base station may select an element of the intersection of the sets of BIs from the two UE devices, i.e., BI #2, and allocate a beam corresponding to the BI #2 to the two UE devices. In this case, as shown in FIG. 6, the base station may schedule the two UE devices for the same time slot. Referring to FIG.

6, the base station according to the second embodiment is capable of increasing the frequency occupancy rate to 75%.

When using the method described above, the base station may select a BI which can increase its scheduling efficiency, from a plurality of BIs fed back from UE, and thus increase the degree of scheduling freedom, which is advantageous. However, UE has increased amount of information to be fed back to the base station, compared with the first embodiment, and thus increases in uplink feedback overhead, which is disadvantageous. Therefore, in the second embodiment, it is important to determine an appropriate threshold, considering a tradeoff relationship between the degree of scheduling freedom and the feedback overhead.

UE may determine a threshold, considering its signal reception capability. The reception capability may vary depending on characteristics of radio frequency (RF) devices used for the implementation of UE, the number of antennas, a signal processing algorithm, an operation environment, etc. The individual UE devices may determine, as a threshold, the minimum reception power for receiving signals at an error probability of an average X %, according to their respective reception capability. For example, when a general channel coding is applied to signals and the X value is 0.1, UE may determine, as a threshold, the minimum reception power so that it received the signals at an average error probability of 0.1%. In contrast, for signals to which a general channel coding is not applied, UE generally employs approximately 0.001 as the X value.

Alternatively, the threshold may be determined by a base station. The minimum value of a threshold determined by a base station may be set considering the reception capability of the UE. In addition, the maximum value of a threshold determined by a base station may be set as a value satisfying a condition where each of the UE devices in corresponding cell coverages is included within one or more beam coverages.

When the maximum value of a threshold is less than the minimum value, the base station may set the minimum value as a threshold. When the maximum value of a threshold is greater than the minimum value, the base station may set a value between the maximum and the minimum values as a threshold. When the threshold is decreased, the degree of scheduling freedom is increased which is advantageous; however, the uplink overhead is increased which is disadvantageous. When the threshold is increased, the degree of scheduling freedom is decreased which is disadvantageous; however, the uplink overhead is decreased which is advantageous. Therefore, the base station may adaptively determine a threshold as an appropriate level of threshold, considering a tradeoff relationship between the degree of scheduling freedom and the uplink overhead.

The method of determining a threshold may be identically applied to embodiments according to the present invention.

In a third embodiment of the present invention, the base station sets the orders of priority for transmission beams, and broadcasts information regarding the orders of priority set according to transmission beams to UE devices. UE selects a beam (beams) with a high priority from the beams with RSRP the level of which is greater than or equal to a preset threshold, and feeds back information regarding a BI (BIs) of the selected beam (beams) to the base station.

Figure 7:
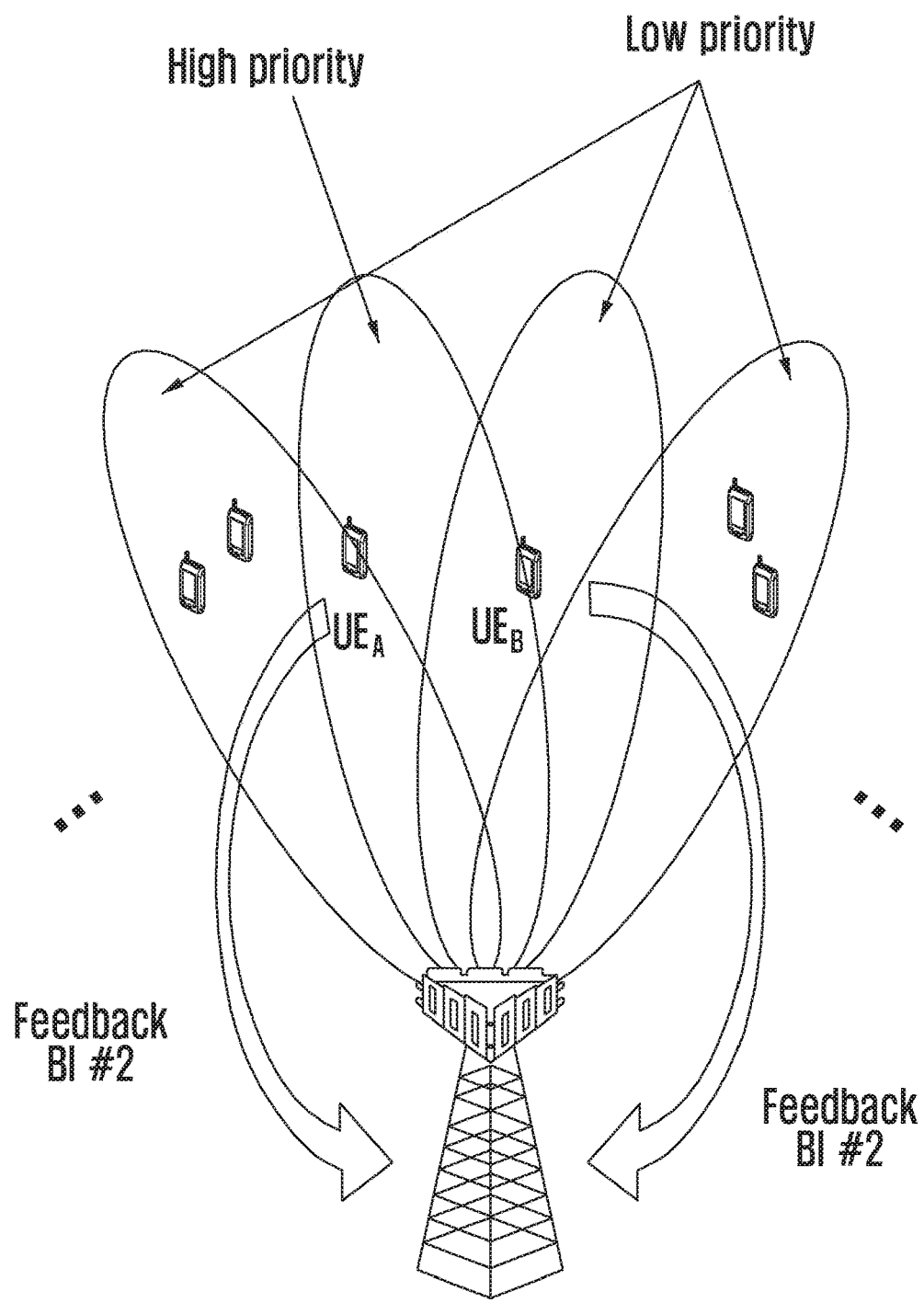
FIG. 7 is a diagram that describes a method for UE to feed back a beam index according to a third embodiment of the present invention.

In a third embodiment of the present invention, priority may have a number (hereinafter called a level or levels). In addition, the same priority may be set to a number of beams. UE discovers a beam with RSRP which is greater than or equal to a threshold from a set of beams allocated the highest priority, and feeds back the BI information corresponding to the discovered beam to a base station. When UE has discovered one or more beams with the highest priority, it may select a beam with the highest RSRP from the beams with the highest priority. When UE has not discovered a beam with RSRP which is greater than or equal to the threshold from a set of beams or a beam with the highest priority, it may perform a beam discovery procedure while sequentially decreasing the priority level. When UE has not discovered a beam with RSRP which is greater than or equal to the threshold from a set of beams with the lowest priority, it ascertains that it is located outside a coverage area under the corresponding base station, and performs a discovery procedure against a base station adjacent to the corresponding base station. As shown in FIG. 7, in a state where the base station can use the two levels of priority and sets a high level of priority of the two levels to BI #2 and a low level of priority to the remaining BIs, when two UE devices measure RSRP as shown in FIG. 2, $UE_A$ selects a BI of a beam with a high priority, BI #2, from the beam indexes of beams with RSRP which is greater than or equal to a threshold, BI #1 and BI #2. $UE_B$ selects a BI of a beam with a high priority, BI #2, from the beam indexes of beams with RSRP which is greater than or equal to the threshold, BI #2 and BI #3, and feeds back BI #2 to the base station. The embodiment is implemented in such a way that, although $UE_B$ has measured RSRP of BI #3 relatively high, it selects BI #2 based on the priority. Therefore, the base station schedules for the two UE devices in a time slot during which BI #2 fed back from the two UE devices is used, thereby achieving the resource occupancy rate of 75% as shown in FIG. 6.

In comparison with the second embodiment where beam indexes (BIs) of all the beams with RSRP which is greater than or equal to a threshold are fed back, a third embodiment based on priority is advantageous in that it can efficiently decrease the feedback overhead in UE and increase the scheduling efficiency in the base station. The embodiments of the present invention are capable of determining priority values of individual beams using various methods.

A first method sets priority of beams in such a way as to: divide beams into groups; and determine part of a number of beams to high priority and the remaining beams to low priority, according to individual groups.

Figure 8:
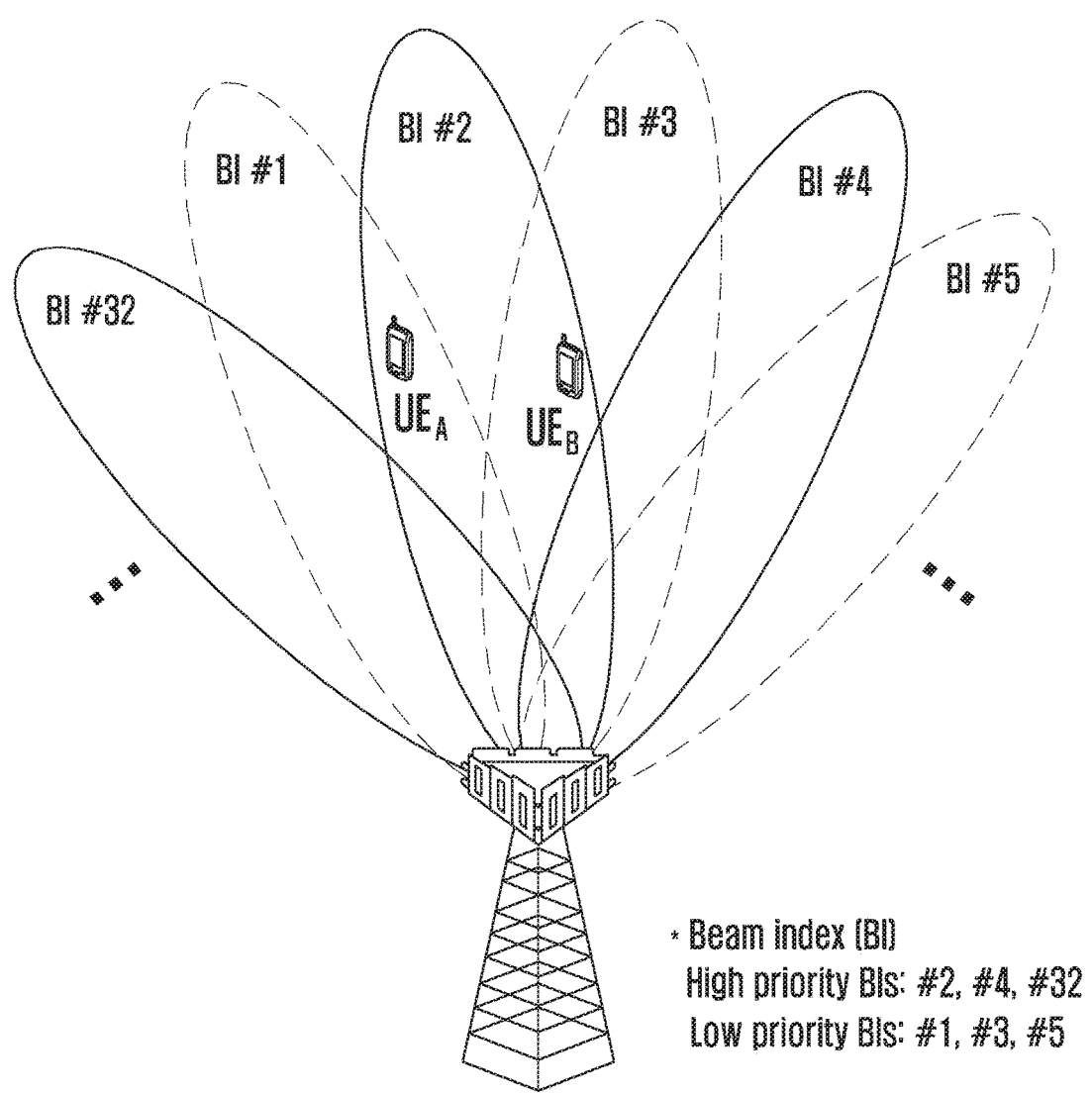
FIG. 8 is a diagram that describes a first method for setting priority.

FIG. 8 is a diagram that describes a first method for setting priority. More specifically, FIG. 8 is an example where a base station divides a total of K available beams into groups each of which include M beams adjacent to each other and sets part of beams in each group to high priority and the remaining beams to low priority.

Referring to FIG. 8, when M=2, one of the beams in each group is allocated to a beam of high priority. That is, the base station sets one of the two beams in each group to have high priority.

The base station adjusts M and allocates high priority to L beams from its available K beams. In the embodiment, since individual UE devices have a high probability of the feedback of beams with high priority, the base station may perform the transmission of signals using only L beams (valid beams) from its available K beams. The less the number of valid beams used by the base station the shorter the cycle of time resource allocated to each beam. In this case, UE has an advantage because it may have more frequent scheduled chances.

A second method sets priority of beams using BI information that UE has fed back during the previous time slot.

The base station may set beams corresponding to BIs in favor with a number of UE devices to beams with high priority, based on BI information that UE devices have fed back during the previous time slot. The BI information that UE devices have fed back during the previous time slot may be information fed back according to embodiments referring to FIGS. 2 to 8.

The second method is advantageous because it can allocate high priority to beams which have a high preference of UE devices and thus operate beams more efficiently.

A third method sets priority of beams based on characteristics of data to be transmitted to UE (e.g., type of data, which may be called a characteristic of packet or a type of packet).

When UE needs a guarantee of success of data reception or needs to transmit data of a high degree of importance, the base station may set a beam corresponding to a BI that the UE fed back to a beam to have high priority. The data of a high degree of importance may be periodic short data which needs to be transmitted, streaming data, HARQ message data (e.g., ACK, NACK), a particular control channel message, data required for a high QoS, etc.

For example, the base station may allocate high priority to a BI selected by UE that needs periodical transmission of "short data," such as VoIP packets. In order to satisfy a delay constraint required by VoIP packets, the base station needs to periodically beam indexes (BI) selected by UE using VoIP to wireless resources. Therefore, the base station may set high priority to a beam that needs to be allocated in order to transmit VoIP packets to UE, and increase the probability of the selection of a corresponding beam by other UE, thereby operating frequency and beam resources efficiently.

A fourth method of setting priority according to beams sets high priority to a beam corresponding to a beam index (BI) selected by UE which needs to transmit a control channel message. The control channel message has characteristics that it needs less resources in transmission than data packet does and it needs to be guaranteed a periodic transmission and a transmission within a preset period of time, according to its types. Therefore, since the base station allocates high priority to a beam index (BI) selected by UE which needs to transmit a control channel message, it can increase the transmission efficiency of a BI required to be allocated as the third method related to VoIP.

An example of the control channel message is an HARQ message of an LTE system. In the LTE system, when the transmitter transmits data to a receiver in one sub-frame, the receiver needs to inform the transmitter of a condition as to whether it has successfully received the transmitted data in a sub-frame after 4 ms. The information regarding a condition as to whether the receiver has successfully received the transmitted data is called an HARQ message. In the fourth embodiment, the base station sets high priority to the BI used for the transmission of the data, so that other UE devices receiving services from the base station can select the BI as a preference BI. In a sub-frame after 4 ms, the transmitter can transmit an HARQ message of the UE using the BI, and also additional data packets or a control channel message for UE devices that have fed back the BI, among the other UE devices that have received services from the base station.

Priority according to beams can be allocated to a number of levels. Embodiments of the present invention are, for the sake of convenience, described based on two levels of priority, i.e., high priority and low priority, but are not limited thereto. For example, the embodiments may also be modified in such a way that priority has two or more levels, which is also subject to the present invention.

In the fourth embodiment according to the present invention, the base stations sets priority to transmission beams and broadcasts the set priority according to transmission beams to UE devices. UE selects N beams with high priority from among beams with RSRP the level of which is greater than or equal to a preset threshold, and feeds back BI information regarding the selected N beams to the base station. When beams have different levels of priority, the UE selects a beam with high priority first of all. When UE needs to select part of the beams which have the same level of priority, it selects beams with high RSRP first of all.

In a fifth embodiment according to the present invention, UE feeds back, to a base station: one BICONTROL in order to receive a control channel and BIDATA of N in order to receive a data channel.

In order to receive a data channel, from among all the beams with RSRP the level of which is greater than or equal to a preset threshold, UE selects top N beams based on RSRP, and feeds back BIDATA corresponding to the selected N beams to the base station.

In an embodiment, in a state where the number of beams with RSRP the level of which is greater than or equal to a preset threshold is M, when M is less than N, UE selects the BIDATA corresponding to the M beams and also virtual BIDATA defined as specific indexes, the number of which is N−M, and thus feeds back a total of BIDATA of N to the base station. Although the base station receives the BIDATA of N, it recognizes, as valid values, only BIDATA of M, excluding the virtual BIDATA (N−M) defined as specific indexes.

In another embodiment, in a state where the number of beams with RSRP the level of which is greater than or equal to a preset threshold is M, when M is less than N, UE may feed back only BIDATA of M to the base station.

In order to receive a control channel, US discovers beams which have RSRP greater than or equal to a preset threshold and a highest priority. When UE has discovered one or more beams satisfying the conditions, it selects a beam with a highest RSRP value from among the discovered beams, and feeds back BICONTROL corresponding to the selected beam to the base station.

The base station selects at least one BIDATA from among the N (or M) BIDATA to receive data channels fed back from UE. The base station transmits data for the UE via time and frequency resources allocated to a beam (beams) corresponding to the selected BIDATA. The base station transmits control information for the UE, using a beam (beams) corresponding to BICONTROL to receive control channels fed back from the UE, via time and frequency resources allocated to the beam (beams). The control information contains a condition as to whether data for the UE is transmitted and information regarding time and frequency resources used for the transmission of data. The control information also contains information regarding the BIDATA corresponding to a beam (beams) used for the transmission of data.

The UE detects whether control information, which is transmitted to the UE and will be used for the reception of a control channel, is contained in time and frequency resource domains allocated to a beam corresponding to BICONTROL fed back to the base station. UE may monitor whether control information is contained in only time and frequency resource domains allocated to a beam corresponding to one BICONTROL that the UE fed back, instead of monitoring whether control information is contained in time and frequency resource domains allocated to all the beams used by a base station. In this case, it is advantageous in that the degree of complexity in UE's operations is reduced and power consumption is also decreased.

After receiving control information related to the UE through the monitoring process described above, the UE may additionally detect, by decoding the control information, whether the data channel has transmitted data information related to the UE. When the UE ascertains that the data information has been transmitted, it detects, by decoding the control information, information regarding BIDATA corresponding to the beam that the base station used to transmit the data information and information regarding time and frequency resources used for the transmission of the data information. The UE is capable of controlling its receiver to perform an efficient reception process, considering the directionality of the transmission beam that the base station used to transmit the data information. In particular, when the UE performs a reception beam-forming in a plurality of different directions, it determines an optimal reception beam-forming direction, considering the directionality of the transmission beam that the base station used to transmit the data information, and controls its receiver to perform a reception beam-forming in the determined direction.

In a sixth embodiment according to the present invention, a base station is capable of determining priority for a set of beams limited for the use of transmission of small packets, and broadcasting, to serving UE devices, information regarding the priority for the beams set for the use of transmission of small packets. In the transmission of uplink small packets, the UE is capable of selecting a beam with high priority, from among beams with RSRP greater than or equal to a preset threshold, and from among the beams limited for the use of transmission of small packets, and feeding back BI information regarding the selected beam to the base station. The small packet may contain control information as well as data. The embodiment is advantageous in that the base station can receive uplink small packets of a plurality of UE devices via a single reception beam-forming.

Figure 9:
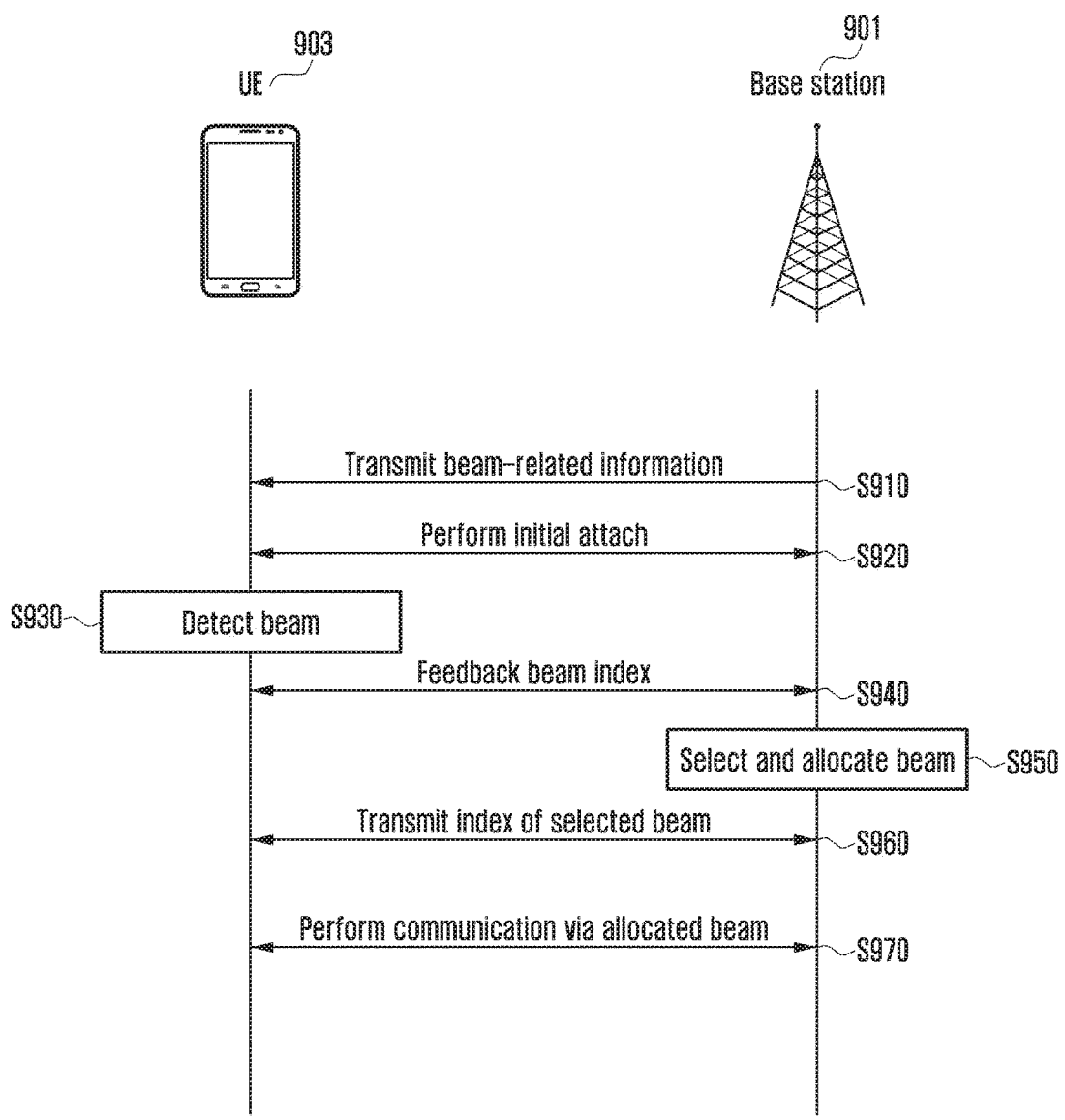
FIG. 9 is a flow diagram that describes operations between UE and a base station according to the present invention.

FIG. 9 is a flow diagram that describes operations between UE 903 and a base station 901 according to the present invention.

Referring to FIG. 9, the base station transmits beam-related information to the UE in operation S910.

The beam-related information may contain the number of beams, information regarding a reference signal, information regarding priority of beams, etc., but is not limited thereto.

The UE performs an initial attachment process with the base station in operation S920.

The base station is capable of performing data communication with the UE using the beam-forming technology. The base station is capable of transmitting, to the UE, information related to a beam-forming. The base station may transmit, to the UE, the beam-related information in the initial attachment process. In particular, when performing an RRC signaling, the base station may transmit, to the UE, the beam-related information via an RRC response message.

In various embodiments, the base station may transmit beam-related information via broadcast signals, regardless of the initial attachment. The base station may periodically or non-periodically transmit beam-related information to the UE. The base station may non-periodically transmit, to the UE, beam-related information in occurrence of a particular event (e.g., a creation of data to be transmitted to UE, a change in beam information, etc.).

Examples of the beam-related information are the number of beams, information regarding priority of beams, etc., but are not limited thereto. When the beam-related information contains information regarding priority of beams, the base station may previously set priority for individual beams as described above.

After that, the UE detects at least one beam in operation S930.

The UE detects a beam with RSRP greater than or equal to a threshold, using reference signals transmitted via a plurality of beams. The UE may determine a threshold as an appropriate value, considering its signal reception capability. The UE may detect a plurality of beams according to the relationship between the threshold and measured RSRP.

In an embodiment, the base station determines a threshold and transmits the threshold to the UE, along with beam-related information. The minimum value of the threshold determined by the base station may be set considering the reception capability of the UE. In addition, the maximum value of the threshold determined by the base station may be set as a value satisfying a condition where each of the UE devices in corresponding cell coverages is included within one or more beam coverages.

When the maximum value of a threshold is less than the minimum value, the base station may set the minimum value as a threshold. When the maximum value of a threshold is greater than the minimum value, the base station may set a value between the maximum and the minimum values as a threshold. When the threshold is decreased, the degree of scheduling freedom is increased which is advantageous; however, the uplink overhead is increased which is disadvantageous. When the threshold is increased, the degree of scheduling freedom is decreased which is disadvantageous; however, the uplink overhead is decreased which is advantageous. Therefore, the base station may adaptively determine a threshold as an appropriate level of threshold, considering a tradeoff relationship between the degree of scheduling freedom and the uplink overhead.

The UE feeds back a beam index (BI) to a base station in operation S940.

In an embodiment, the UE is capable of feeding back a beam index of a beam which has the highest measured RSRP to the base station.

Alternatively, the UE may feed back, to the base station, beam indexes of all the beams with RSRP measured as levels greater than or equal to a threshold.

Alternatively, the UE may select one or more beams, based on priority information that has been received, and feed back beam indexes of the selected beam (beams) to the base station. Since the method for the UE to select beam indexes to be fed back was described above, it detailed description is omitted below.

The feedback may be transmitted via a Physical Uplink Control Channel (PUCCH), but is not limited thereto.

The base station selects a beam to communicate with the UE, from among the beams corresponding to the received beam indexes, and allocates the selected beams to wireless resources in operation S950.

When the base station has received one beam index, it may select one beam corresponding to the received beam index.

When the base station has received a plurality of beam indexes, it may select a beam corresponding to a beam index which is most frequently fed back from UE devices. That is, the base station may select a beam corresponding to a beam index contained in an intersection of groups of beam indexes received from UE devices.

Alternatively, the base station may select a beam, based on beam-related information transmitted to UE in operation S910. For example, the base station may select a beam based on priority information regarding beams.

The base station allocates the selected beam to time and frequency resources and schedules the resources for the UE.

The base station transmits the beam index of the selected beam to the UE in operation S960. The base station may transmit, to the UE, beam allocation information containing the beam index, via a broadcast channel or a control channel.

The base station performs data communication with the UE via the allocated beam in operation S970. The base station may communicate with the UE via a time/frequency resource using a corresponding beam.

Figure 10:
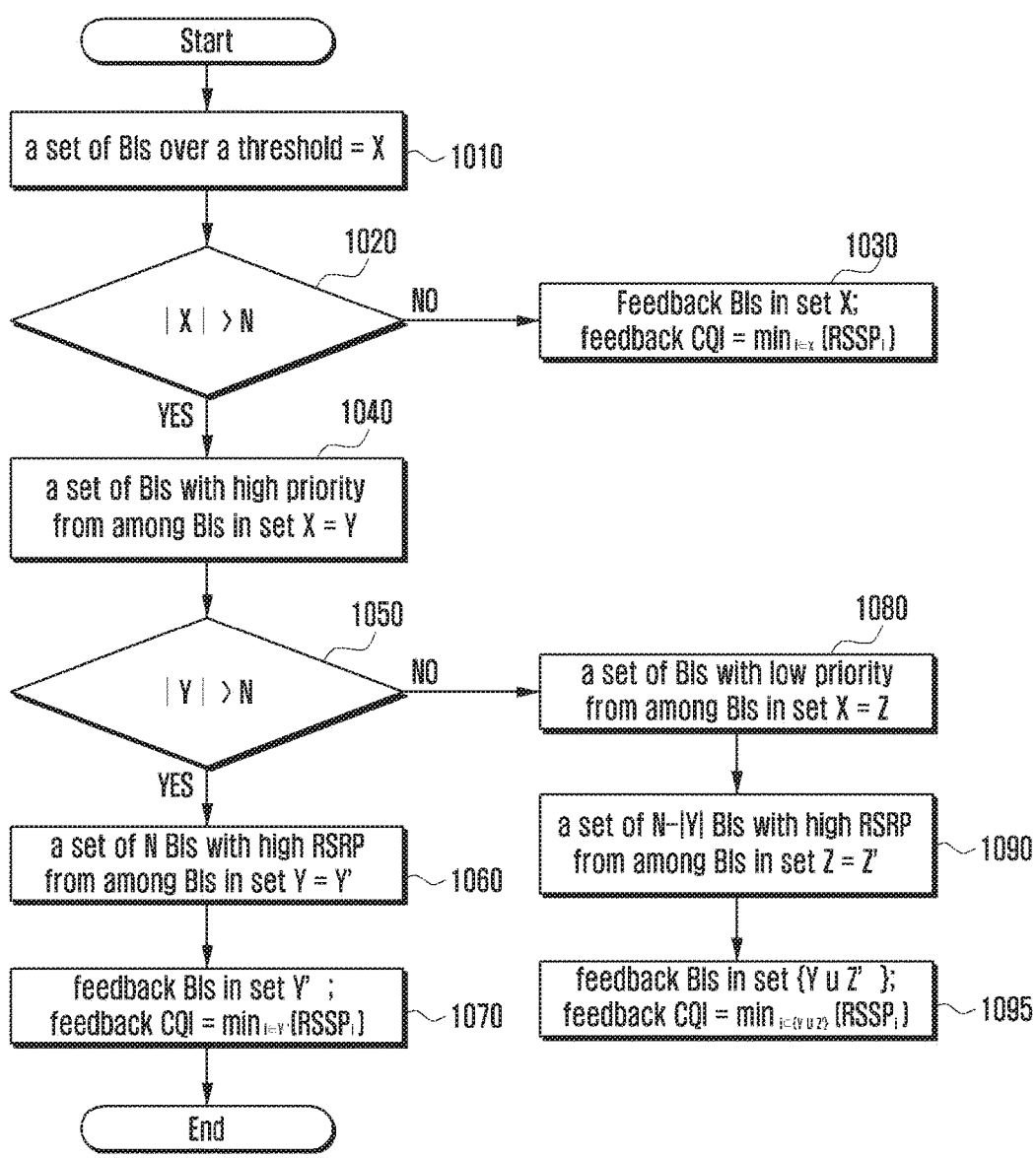
FIG. 10 is a flowchart that describes a method for UE to select a beam index according to the present invention.

FIG. 10 is a flowchart that describes a method for UE to select a beam index according to the present invention. More specifically, FIG. 10 is an example of a method for UE to select N beam indexes based on two levels of priority.

The UE creates a set, X, of beam indexes of beams with RSRP measured as a level greater than or equal to a preset threshold (in an embodiment, the measured level of RSRP is greater than a preset threshold) in operation 1010.

The UE determines whether the number of BIs contained in the set X, expressed as "|X|," is greater than the number of BIs, N, which can be reported to the base station in operation 1020. That is, UE detects whether the number of beams to be validly used is greater than the number of beams to be possibly reported to the base station and thus selects a BI based on the determination.

When the UE ascertains that the number of BIs contained in the set X, "|X|," is not greater than the number of BIs, N, in operation 1020, it feeds back all the beam indexes in the set X to the base station in operation 1030. On the other hand, when the UE ascertains that the number of BIs contained in the set X, "|X|," is greater than the number of BIs, N, in operation 1020, it performs operations to select a beam index.

The UE creates a set Y of beam indexes of beams with high priority, from among the beam indexes contained in a set X in operation 1040. The UE determines whether the number of BIs contained in the set Y, expressed as "|Y|," is greater than the number of BIs, N, in operation 1050.

When the UE ascertains that the number of BIs contained in the set Y, "|Y|," is greater than the number of BIs, N, in operation 1050, it needs to extract part of the BIs of the beams with high priority. The UE extracts, from among the beam indexes in the set Y, N beam indexes of the beams with RSRP the level of which is measured, from highest to lowest, and then creates a set Y' in operation 1060. After that, the UE feeds back the N beam indexes in the set Y' to the base station in operation 1070.

On the other hand, when the UE ascertains that the number of BIs contained in the set Y, "|Y|," is not greater than the number of BIs, N, in operation 1050, it creates a set Z of BIs corresponding to beams with low priority in operation 1080. The UE extracts, from among the beam indexes in the set Z, N-|Y|beam indexes of beams with RSRP the level of which is measured, from highest to lowest, and then creates a set Z' in operation 1090. After that, the UE feeds back a total of N beam indexes in the set Y and set Z' to the base station in operation 1090.

Figure 11:
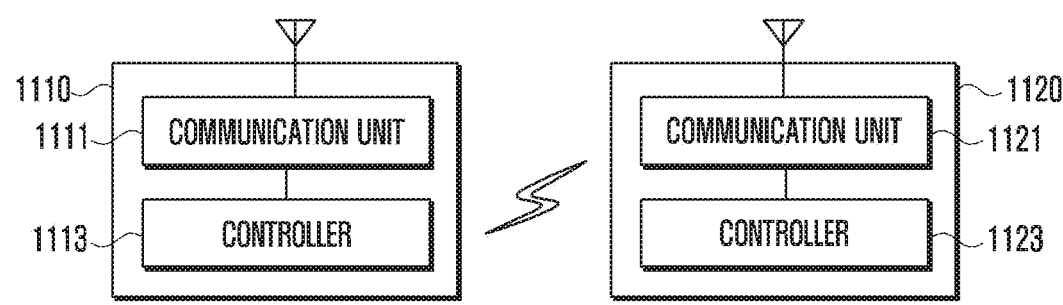
FIG. 11 shows block diagrams of UE and a base station according to the present invention.

FIG. 11 shows block diagrams of UE and a base station according to the present invention.

Referring to FIG. 11, UE 1110 is capable of including a communication unit 1111 and a controller 1113.

The communication unit 1111 performs data communication with a base station 1120.

The controller 1113 controls the components in the UE 1110 in order to perform operations according to the present invention.

The controller 1113: measures RSRP of nearby beams; selects one of the beams, based on information regarding beams transmitted from the base station 1120; and controls the communication unit 1111 to transmit a beam index of the selected beam to the base station 1120. The controller 1113 controls the communication unit 1111 to communicate with base station 1120, using a corresponding beam, based on the beam allocation information transmitted from the base station 1120.

The base station 1120 is capable of including a communication unit 1121 and a controller 1123.

The communication unit 1121 performs data communication with at least one UE device 1110.

The controller 1123 controls the components in the base station 1120 in order to perform operations according to the present invention.

The controller 1123 transmits beam-related information to at least one UE 1110. When the controller 1123 receives a beam index from the at least one UE 1110, it selects a particular beam index according to a preset standard, and controls the communication unit 1121 to transmit information regarding the corresponding beam to the UE 1110. The controller 1123 allocates the selected beam to a wireless resource, and controls the communication unit 1121 to perform data communication with the at least one UE 1110 using the resource.

Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims. It is to be understood that embodiments are explanatory only and are not restrictive of the invention.

The terms and words used in the description are not limited to the bibliographical meanings, but, are merely used by the inventor to enable a clear and consistent understanding of the present disclosure. Accordingly, it should be apparent to those skilled in the art that the description of various embodiments of the present disclosure is provided for illustration purpose only and not for the purpose of limiting the present disclosure as defined by the appended claims and their equivalents.

The invention claimed is:

1. A method of a base station in a wireless communication system, the method comprising:
   transmitting reference signals using a plurality of beams and information on priorities of the plurality of beams;
   receiving, from a terminal, index information on at least one beam selected from the plurality of beams; and
   scheduling a beam selected from the at least one beam to the terminal,
   wherein the at least one beam is selected from beams having a reference signal received power greater than a predetermined threshold based on the priorities of the plurality of beams, and
   wherein the priorities of the plurality of beams are determined based on types of data transmitted through the plurality of beams.

2. The method of claim 1, further comprising:
   setting priorities to the plurality of beams; and
   transmitting the information on the priorities.

3. The method of claim 2, wherein the setting of the priorities to the plurality of beams comprises:

dividing the plurality of beams into a plurality of beam groups, each of which contains M beams adjacent to each other; and setting at least one beam in each beam group of the plurality of beam groups to have high priority and remaining beams to have low priority.

4. The method of claim 2, wherein the setting of the priorities to the plurality of beams comprises:

receiving index information on the at least one beam from at least one terminal; and setting a beam which is most frequently received from the at least one terminal to have high priority.

5. The method of claim 1, wherein the index information comprises:

index information on at least one beam set to have high priority.

6. A method of a terminal in a wireless communication system, the method comprising:

receiving reference signals and information on priorities of a plurality of beams;

measuring the reference signals regarding the plurality of beams;

selecting at least one beam from beams having a reference signal received power greater than a predetermined threshold based on the priorities of the plurality of beams;

transmitting, to a base station, index information on the at least one beam; and receiving, from the base station, scheduling information on a beam selected from the at least one beam, wherein the priorities of the plurality of beams are determined based on types of data transmitted through the plurality of beams.

7. The method of claim 6, wherein the transmitting, to the base station, of the index information on the at least one beam comprises:

transmitting index information on at least one beam set to have high priority.

8. The method of claim 6, wherein at least one beam in each beam group of the plurality of beam groups is set to have high priority and remaining beams are set to have low priority, and wherein each of the plurality of beam groups contains M beams adjacent to each other.

9. The method of claim 6, wherein a beam which is most frequently reported from at least one terminal to the base station, is set to have high priority.

10. A base station in a wireless communication system, the base station comprising:

a transceiver; and a controller configured to:

control the transceiver to transmit reference signals using a plurality of beams and information on priorities of the plurality of beams, to a terminal, control the transceiver to receive index information on at least one beam selected from the plurality of beams from the terminal, and schedule a beam selected from the at least one beam to the terminal, wherein the at least one beam is selected from beams having a reference signal received power greater than a predetermined threshold based on the priorities of the plurality of beams, and wherein the priorities of the plurality of beams are determined based on types of data transmitted through the plurality of beams.

11. The base station of claim 10, wherein the controller is further configured to:

set priorities to the plurality of beams, and control the transceiver to transmit the information on the priorities.

12. The base station of claim 11, wherein the controller is further configured to:

divide the plurality of beams into a plurality of beam groups each of which contains M beams adjacent to each other, and set at least one beam in each beam group of the plurality of beam groups to have high priority and remaining beams to have low priority.

13. The base station of claim 11, wherein the controller is further configured to:

receive index information on the at least one beam from at least one terminal, and set a beam which is most frequently received from the at least one terminal to have high priority.

14. A terminal in a wireless communication system, the terminal comprising:

a transceiver; and a controller configured to:

control the transceiver to receive reference signals and information on priorities of a plurality of beams, measure reference signals regarding the plurality of beams, select at least one beam from beams having a reference signal received power greater than a predetermined threshold based on the priorities of the plurality of beams, control the transceiver to transmit, to a base station, index information on the at least one beam, and control the transceiver to receive, from the base station, scheduling information on a beam selected from the at least one beam, wherein the priorities of the plurality of beams are determined based on types of data transmitted through the plurality of beams.

15. The terminal of claim 14, wherein the controller is further configured to control the transceiver to transmit index information on at least one beam set to have high priority.

16. The terminal of claim 14, wherein at least one beam in each beam group of the plurality of beam groups is set to have high priority and remaining beams are set to have low priority, and wherein each of the plurality of beam groups contains M beams adjacent to each other.

* * * * *